(No Model.) 2 Sheets—Sheet 1.

E. ELLIOTT.
WHEELED PULVERIZER.

No. 388,349. Patented Aug. 21, 1888.

WITNESSES:
S. H. Kuck
C. H. Fisher

INVENTOR:
Ephraim Elliott.

(No Model.) 2 Sheets—Sheet 2.
E. ELLIOTT.
WHEELED PULVERIZER.
No. 388,349. Patented Aug. 21, 1888.
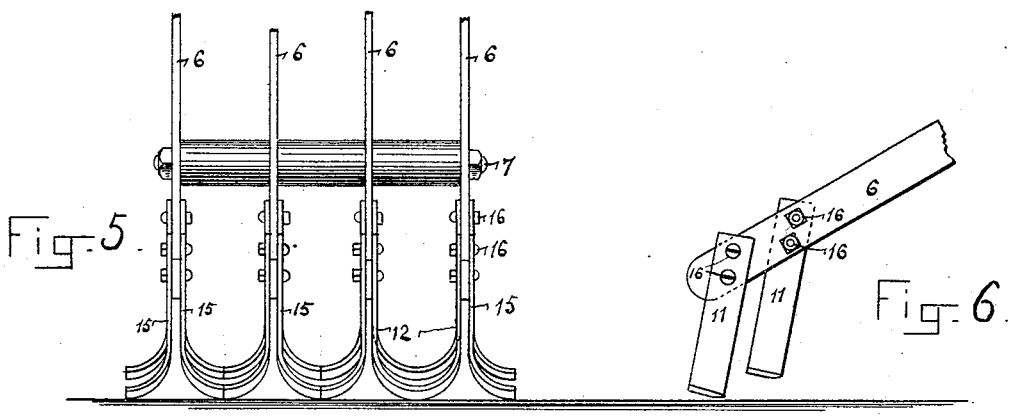
WITNESSES: 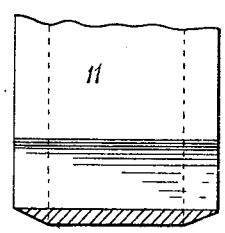 INVENTOR:
S. H. Kint.
C. H. Fisher. Fig. 7. Ephraim Elliott.

UNITED STATES PATENT OFFICE.

EPHRAIM ELLIOTT, OF CHELMSFORD, MASSACHUSETTS.

WHEELED PULVERIZER.

SPECIFICATION forming part of Letters Patent No. 388,349, dated August 21, 1888.

Application filed June 9, 1888. Serial No. 276,631. (No model.)

*To all whom it may concern:*

Be it known that I, EPHRAIM ELLIOTT, a citizen of the United States, residing at Chelmsford, in the county of Middlesex and Commonwealth of Massachusetts, have invented a new and useful Improvement in Wheeled Pulverizers for the Use of Gardeners, of which the following is a specification.

The object of my invention, which consists of certain constructions and combinations of parts, as hereinafter set forth, is to provide a very light, strong, and efficient means for pulverizing the soil of gardens, destroying weeds, and doing other similar work.

Figure 1:
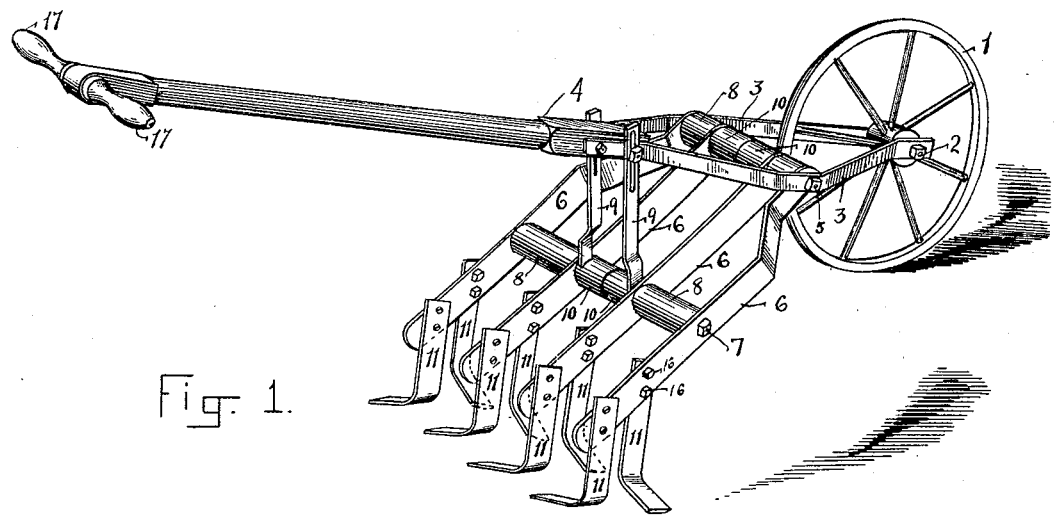
Figures 2, 3:
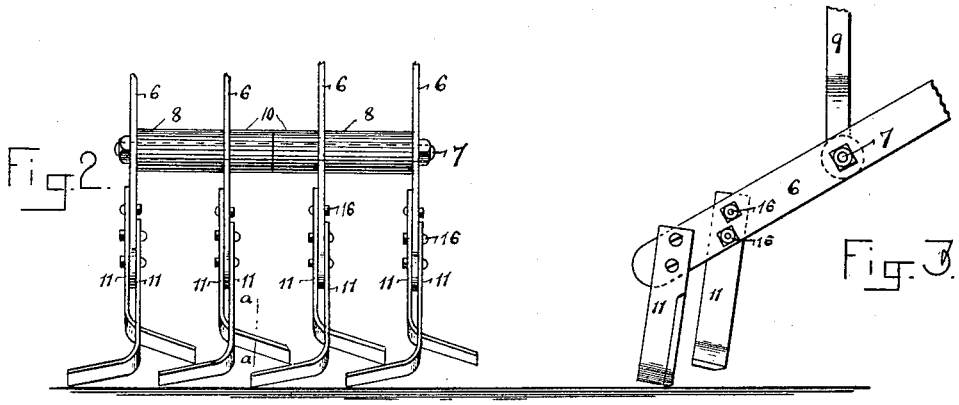
Figure 4:
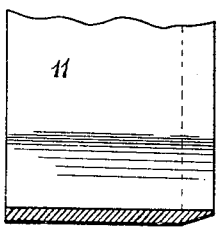

My invention is illustrated in the accompanying drawings, in which Figure 1 is a perspective view of one form of my improved implement. Fig. 2 is a partial rear elevation of said implement, and Fig. 3 is a partial side elevation of the same. Fig. 4 is a partial elevation, upon an enlarged scale and partly in section at the line *a a* of Fig. 2, of one of the cutting knives. Fig. 5 is a partial rear elevation of a modified form of the new implement, and Fig. 6 is a partial side elevation of the same. Fig. 7 is a partial sectional elevation of a modified form of the knife which is sometimes used.

Similar reference-numbers refer to similar parts in all of the views.

In the drawings, the wheel 1 is shown as supported upon the axle 2, which is in turn supported by the fork 3, the branches of which are secured to the main handle 4 and in effect form a part thereof. The handle 4 is made of such a length that a man, grasping the handles 17 upon said main handle, may easily push the implement before him as he walks without striking the working parts thereof with his feet. About midway of the length of the branches 3 I insert the bolt 5, upon which the forward ends of the knife-carriers 6 are pivotally supported, said bolt preferably passing through the carriers with a loose fit. The knife-carriers are preferably made, as shown, of wide thin strips of metal. Four of such carriers are shown in use, although this implement as illustrated is intended for use with either one, two, or more of such carriers, which may be made of any suitable material. Two of the carriers are shown as bent, in order to reduce the width of the implement at the point where the bolt 5 is inserted. Others may be similarly bent, if so desired. At a distance from the pivot 5, and preferably about midway of the length of the knife-carriers 6, I insert the bolt 7. Upon the bolt 7, and preferably upon the bolt 5 and between the carriers 6, I place sleeves 8 and 10, preferably of wood, with their diameter about equal to the width of the carriers 6. All of said carriers are clamped rigidly together by the bolt 7; also supported upon the bolt 7 are the links 9, the upper ends of which are preferably slotted and secured to the handle 4 by a bolt in such a way that the handle may be easily clamped at any desirable height with respect to the other parts of the implement, as shown. It is intended that when but a single carrier 6 is used the bolt 7 shall be replaced by a shorter one, and that the carrier shall then be clamped between the links 9 and the sleeves 10, which for that purpose are made shorter than are the sleeves 8. No sleeves are really necessary upon the bolt 5, although I prefer to place them there.

Upon the rear ends of the carriers 6 I attach the detachable knives 11 by suitable bolts, 16, which pass through said carriers and said knives. These knives are preferably made of wide and thin bar-steel, of uniform section, simply bored or punched to allow the bolts 16 to pass through them, bent to the proper shape and sharpened upon their forward edges. They should also be properly tempered. It is intended that the knives 11 should be arranged upon their carriers in a way which depends to some extent upon the work which is to be done by the implement. The shape of the knives will sometimes be slightly varied to suit the work which is intended to be done by the implement and fulfill the conditions under which it is to be used. In Figs. 1, 2, and 3 the knives are shown as simply bent at an angle slightly greater than a right angle, thus forming a long nearly horizontal cutting-blade and with a round corner at the angle. The upper surface of the substantially horizontal blade slopes upwardly and backwardly. In Fig. 5 the knives are shown as somewhat shorter in their horizontal arms than those shown in Fig. 1 and as arranged differently from those shown in said figures, more knives being used in the form shown in Fig. 5 than in the other form. If the implement is to be made as shown in Fig. 5, the inner knives of the set may be sometimes made U-shaped, as shown at 12, instead of being made like half of the U, as shown at 15.

As shown in the drawings, the upper part of the shank of each knife is preferably inclined forward from a vertical line—a position which causes the rear edge of the lower or substantially horizontal part of the blade of each knife to be higher than its front part or sharpened edge. This inclination of the nearly horizontal part of the knife may be obtained, though less satisfactory, by bending the bar of steel in such a manner that the shank of the knife may be vertical or inclined backward, while the lower or nearly horizontal portion still retains its inclined position with the lowest side forward. As I prefer to make the pieces of this implement upon the interchangeable system, it is possible to so make the holes in the knives 11 that they may be placed upon the carriers 6 with either edge to the front of the machine. The knives may then be made with both edges sharpened, as shown in Fig. 7, in which case the knives may be reversed in position when they become worn or dulled, thus bringing new and sharp edges into action.

On account of the peculiar position of the lowest part of the knives 11, the soil through which they are pushed becomes very thoroughly loosened, pulverized, and prepared for the reception of seed, if such is the desired object. This pulverization is effected by the forward edges of the knife-blades entering the soil, which rises upon the upwardly and backwardly inclined surface of the lower or substantially horizontal portion of the blades of the knives as the implement is forced forward, and then falls from the rear edge thereof, crumbling as it falls. The knives may be easily forced through the soil at any desired depth within the range of action of the implement, although I sometimes attach to the rear end of the carriers 6 one or more wheels, adjustable in height, to regulate the depth to which said knives shall penetrate the soil. I prefer to place the forward set of knives at a somewhat greater height than the rear set, as shown in Figs. 3 and 6, in order that they may loosen the soil near the surface of the ground while the rear set loosens it at a greater depth, thus dividing the total work to be done between the two sets. Sometimes more or less than two sets of knives may be used.

This implement is very effectual as a weed-killer when the knives are run through weedy ground at the proper distance from the surface, the implement then acting to shake the soil from the roots of the weeds, thus allowing them to dry up and die before they can become rooted again.

In order that the implement may be easily forced forward by the operator, I prefer to attach the handles 17 at right angles to the main handle 4, thereby giving the operator means to perfectly control the whole implement with great ease, to incline it to one side or the other, and to fix the depth to which it shall penetrate the soil.

What I claim as new, and desire to secure by Letters Patent, is—

1. The wheel and its axle, combined with the handle connected to said axle, the knife-carriers connected to said handle by a pivot and secured firmly together at a distance from said pivot, the knives constructed substantially as described and detachably connected to said knife-carriers, and the slotted links connecting said handle with said knife-carriers, substantially as described, and for the purposes specified.

2. The wheel and its axle, combined with the handle connected with said axle, the knife-carriers connected to said handle by a pivot and secured firmly together at a distance from said pivot by a bolt, 7, the links connecting said bolt with said handle, and a plurality of sets of knives with substantially horizontal blades whose upper surfaces are inclined upwardly and backwardly, and with the forward set placed higher than the backward set, substantially as described, and for the purposes specified.

EPHRAIM ELLIOTT.

Witnesses:
  S. H. KENT,
  C. H. FISHER.